United States Patent [19]
Hildebrandt

[11] Patent Number: 5,517,072
[45] Date of Patent: *May 14, 1996

[54] METHOD AND APPARATUS FOR INCREASING THE EFFICIENCY OF ELECTRICAL ROTARY MACHINES

[75] Inventor: James J. Hildebrandt, Corona Del Mar, Calif.

[73] Assignee: Efficient Propulsion, Inc., Irvine, Calif.

[*] Notice: The term of this patent shall not extend beyond the expiration date of Pat. No. 5,361,012.

[21] Appl. No.: 320,736

[22] Filed: Oct. 11, 1994

Related U.S. Application Data

[63] Continuation-in-part of Ser. No. 996,709, Dec. 24, 1992, Pat. No. 5,361,012.

[30] Foreign Application Priority Data

Dec. 22, 1993 [WO] WIPO ...................... PCT/US93/12469

[51] Int. Cl.$^6$ .................................................. H01R 39/56
[52] U.S. Cl. .............................. 310/228; 310/52; 310/53; 310/54; 310/221; 310/222
[58] Field of Search ................................. 310/52, 53, 54, 310/57, 62, 63, 220, 221, 227, 228

[56] References Cited

U.S. PATENT DOCUMENTS

| | | | |
|---|---|---|---|
| 265,936 | 10/1882 | Thomson | 310/228 |
| 394,095 | 12/1888 | Buckingham | 310/228 |
| 2,606,946 | 8/1952 | Fisher | 310/228 |
| 2,854,597 | 9/1958 | Foote et al. | 310/228 |
| 3,300,667 | 1/1967 | Boes et al. | 310/228 |
| 3,612,928 | 10/1971 | Hokky | 310/87 |
| 3,714,482 | 1/1973 | Lace | 310/228 |
| 3,743,867 | 7/1973 | Smith, Jr. | 310/52 |
| 3,891,528 | 6/1975 | Griswold | 204/186 |
| 4,086,034 | 4/1978 | Hokky | 417/364 |
| 4,605,581 | 8/1986 | Stevens et al. | 428/96 |
| 5,361,012 | 11/1994 | Hildebrandt | 310/228 |

OTHER PUBLICATIONS

The Condensed Chemical Dictionary, 1981, pp. 11, 91, 325, 326, 334, 337, 431, 526, 527, 864, 871, 1041–1043, 1053.

McGraw–Hill Encyclopedia of Chemistry, 1983, pp. 26, 27, 65.

*Primary Examiner*—Steven L. Stephan
*Assistant Examiner*—Elvin G. Enad
*Attorney, Agent, or Firm*—Jerry R. Seiler

[57] ABSTRACT

An improved electric motor having a commutator and brushes incorporates a fluid comprising one or more stable halogenated aliphatic hydrocarbons which is liquid from ambient temperatures up to about 150° F., and means for applying said fluid continuously to brushes adjacent said commutator while the apparatus is running.

31 Claims, 5 Drawing Sheets

METHOD AND APPARATUS FOR INCREASING THE EFFICIENCY OF ELECTRICAL ROTARY MACHINES

This application is a continuation-in-part of application Ser. No. 07/996,709, filed Dec. 24, 1992, now U.S. Pat. No. 5,361,012.

BACKGROUND OF THE INVENTION

Virtually any lubricant supplied to a moving part reduces friction and thus increases efficiency and longevity. However, the need for labor intensive frequent reapplication of such lubricants makes it highly desirable to find a method and apparatus for applying such lubricants in a constant manner, without requiring frequent maintenance. Furthermore, many electromagnetic machines, such as DC motors, generators and the like are used in configurations where it is virtually impossible to periodically add some form of lubricant to the moving parts without having to disassemble the entire machine, thus rendering it cost ineffective to attempt to keep the machine operating at its optimum efficiency. There is therefore an ongoing need for an innovative means for accomplishing the aforementioned improvement in electromagnetic machine operating efficiency, without incurring the disadvantages of the prior art.

With the depletion of fossil fuels, the imminent need for alternative power resources has focused much research and development emphasis on the use of electric and solar electric alternatives. One example of this emphasis is the current interest in replacing the internal combustion engine in automobiles with battery operated electric motors. Although the emphasis of research and development has been placed on the storage of electricity by developing lighter, more efficient batteries or more efficient solar collectors, another important aspect of the use of electric and solar electric alternatives to fossil fuel devices is increasing the efficiency of electric motors in a cost effective manner.

The present invention relates generally to increasing the efficiency characteristics of electromagnetic machines, including direct current motors, generators and other related components and systems which use frictionally engaged rotating parts such as bearings, brushes and commutators. The inventor herein has found that a significant increase in electromagnetic machine efficiency can be achieved by providing a continuous bathing of the components thereof with liquid halogenated aliphatic hydrocarbons, while the machine such as a DC motor or generator is in operation. More specifically, the present invention relates to a method for introducing a continuous bath of liquid halogenated aliphatic hydrocarbons to the components of such machines, including electric motors and the like to reduce operating temperature, sparking, friction and resistance and to clean surfaces of carbon, ash and metal particulates for increasing the efficiency and longevity of the components of electromagnetic machines while they are in operation.

SUMMARY OF THE INVENTION

The present invention provides a method and apparatus for addressing the most significant cause of DC motor inefficiency, namely contact between rotating frictional components such as the brushes, typically comprised of carbon, and the commutator. Significant inefficiencies result from the contact of the brushes with the surface of the commutator. The primary adverse effects of such continuous contact includes the accumulation of particulates of carbon and ash eroded from the brushes during operation. These particulates pass between the brushes and the commutator surface, creating less effective commutation which results in excessive friction, increased temperature, vibration and premature erosion of the surfaces of both the brushes and the commutator, as well as other moving components within the motor. All of these effects are exacerbated in environments where humidity is low or in the presence of additional environmental elements, such as dust. The present invention provides a method and apparatus for introducing a continuous bath of liquid halogenated aliphatic hydrocarbons to the integral components of an electric motor. A continuous flow of these fluids and various combinations thereof provide positive commutation between the brushes and commutator surfaces and reduces bearing surface wear in the operation of the DC motor.

The method of the present invention can be carried out in any manner which provides a continuous supply of such liquid to the area of the brushes and commutator, but so that application of the liquid to that area is carried out continuously and without manual intervention. A number of different such embodiments are disclosed herein. By way of example, one such apparatus comprises a low volume external pump type system which can be integrally connected to a DC motor. Another example is the use of an internal impeller pump affixed to the main shaft of the DC motor. Whether the pump system is external or internal, it has been found advantageous to employ a filter to eliminate particulates of approximately 40 microns or larger, released by the brushes and which would otherwise accumulate in the bathing process. A number of other alternative methods for introducing the fluid into the operating portion of the electromagnetic machine are disclosed herein. The primary function of each is to provide a relatively consistent volume of fluid between the brush, commutator and bearing surfaces to reduce the operating temperature of the bearings and brushes, to reduce sparking, friction and resistance, to increase commutation performance, reduce brush and commutator wear and clean the surfaces of carbon, ash and metal particulates from the commutator in a continuous manner. This results in improved efficiency, smoother transition through different speed ranges, quieter operation and even a reduction in the production of electrical noise interference.

It should be understood that the present invention is not limited for use with only DC machines or with only brush-type components thereof. For example, significant efficiency improvements may also be realized using the present invention in AC machines and in brushless DC machines. Furthermore, further refinements are also contemplated, such as concurrently using liquid halogenated aliphatic hydrocarbons of different viscosities at different locations within the machines and recovering each such liquid in a separate reservoir. The use of feedback to vary liquid parameters, such as temperature or viscosity, as a function of efficiency, is also contemplated. Accordingly, the description herein of a preferred embodiment of the invention should be deemed as exemplary only and not limiting of the scope of protection afforded hereby.

Objects of the Invention

It is therefore a principal object of the present invention to provide a method and apparatus for increasing the efficiency of electromagnetic machines.

It is an additional object of the present invention to improve the efficiency and performance of electrical machines, such as DC motors by introducing a continuous bath of liquid halogenated aliphatic hydrocarbons into such motors and particularly between the surfaces of frictionally engaged rotating components such as the brush and commutator of DC motors.

It is still an additional object of the present invention to improve the efficiency of DC motors by providing systems which introduce the continuous flow of liquid halogenated aliphatic hydrocarbons particularly between the brushes and commutator of a DC motor to reduce operating temperature, sparking, friction and resistance, as well as to reduce brush and commutator wear and to remove particulates and other forms of waste material.

BRIEF DESCRIPTION OF THE DRAWINGS

The aforementioned objects and advantages of the present invention, as well as additional objects and advantages thereof, will be more fully understood hereinafter as a result of a detailed description of preferred embodiments when taken in conjunction with the following drawings in which.

DETAILED DESCRIPTION OF PREFERRED EMBODIMENTS

Figure 1:
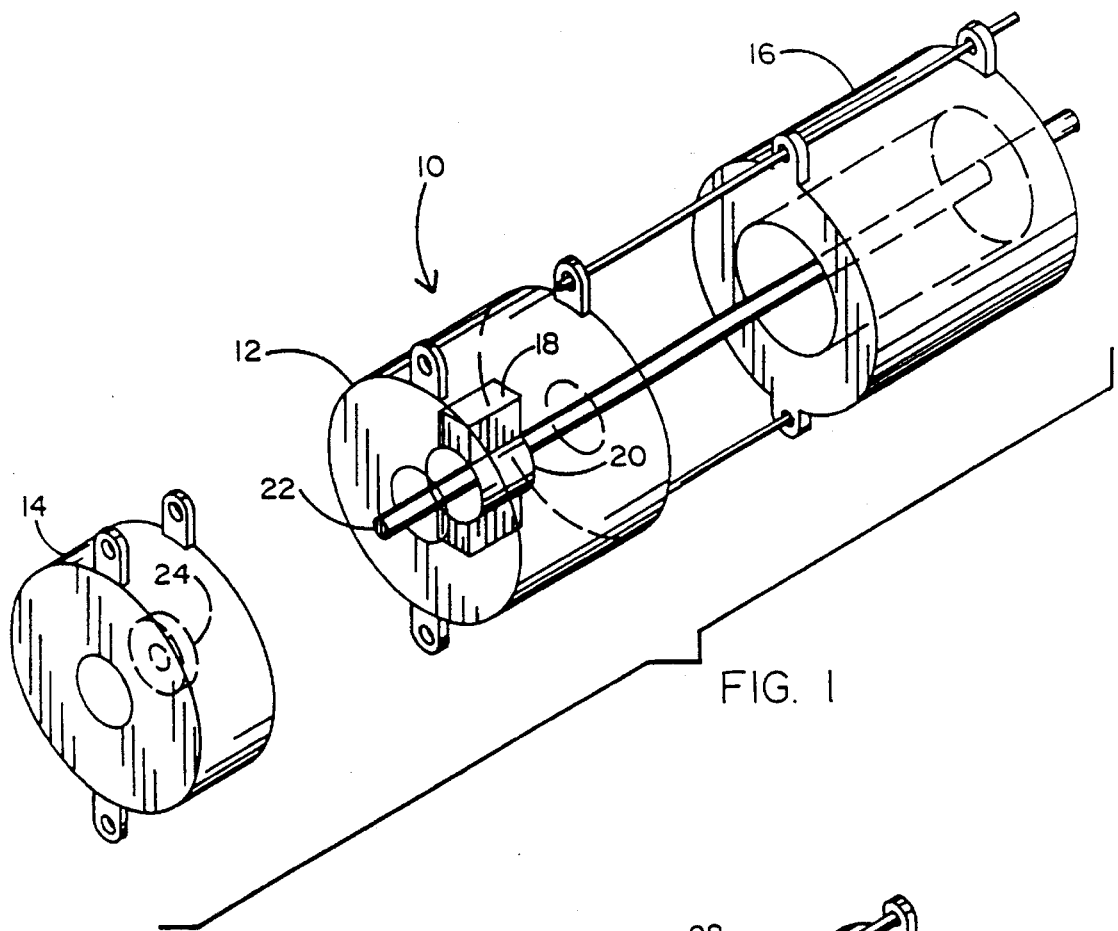
FIGS. 1 and 2 represent exploded and assembled views, respectively, of an electric motor incorporating a fluid circulating apparatus of the present invention.
Figure 2:
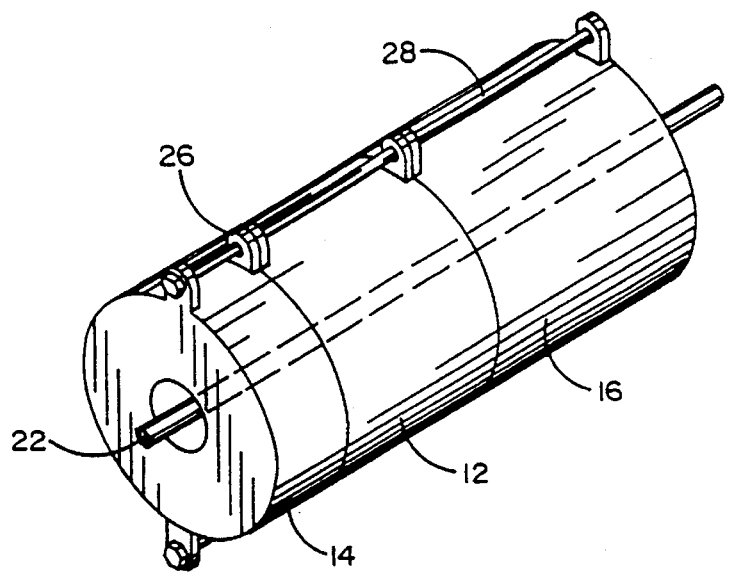

Referring now to the accompanying drawings and specifically FIGS. 1 and 2 thereof, it will be seen that a first embodiment of the present invention comprises a DC motor 10 having a commutation housing 12, a regenerator housing 14 and a motor winding housing 16. The commutation housing 12 provides an enclosure for the brushes 18 and commutator 20. A rotated shaft 22 extends the full length of the motor 10. The commutation housing 12 is designed to contain a liquid halogenated aliphatic hydrocarbon which is used to continually bath the surface of the brushes immediately adjacent the commutator in a manner to be described hereinafter. Regenerator housing 14 provides the support for the end of the shaft 22 by means of bearing 24 and can be removed to service the interior of the commutation housing, without the disruption of the final drive and armature. The motor winding housing 16 encloses all of the motor windings separately from the commutation housing. A plurality of bolt flanges 26 and elongated bolts 28 provide a simple yet reliable method for interconnecting the housings into one rigid unit as shown in FIG. 2.

Figure 3:
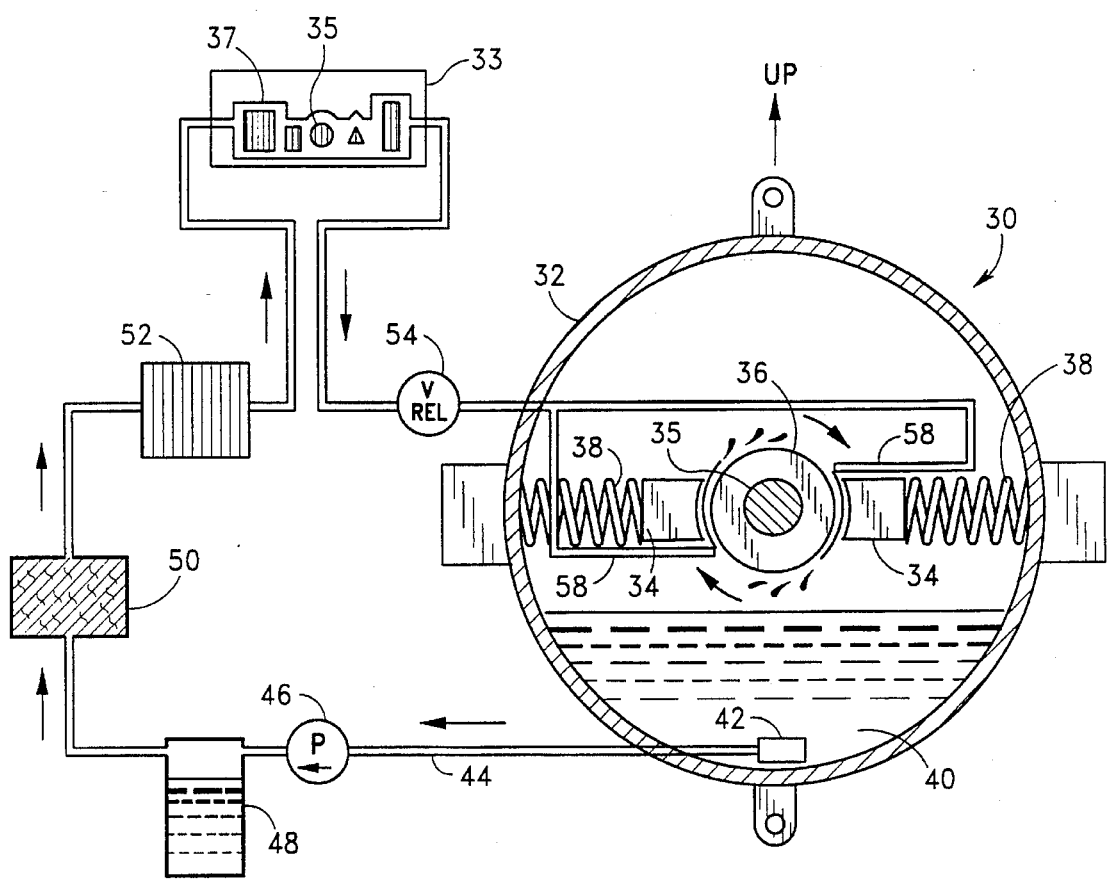
FIG. 3 is a diagrammatic illustration of a DC motor of the present invention, employing a low volume external pump connected thereto.

A second embodiment of the present invention is illustrated in FIG. 3. The system shown comprises a DC motor 32 having brushes 34 and a commutator 36, the brushes being compressed against the commutator by tension springs 38 in a conventional manner. A liquid halogenated aliphatic hydrocarbon 40 is contained within the bottom portion of the DC motor 32 in the form of a pool or reservoir, at the bottom of which there is a pick-up sump 42. The sump 42 leads to a circulation line 44 which is connected to a pump 46, a reservoir 48, a filter 50, a radiator 52 and a pressure control valve 54. Any heat exchange apparatus, radiators, coolers, and other components for cooling the fluid may be used. The apparatus shown in FIG. 3 also includes a controller 33 for controlling the operation of one or more of the various components of the system. Such a controller incorporates an integrated circuit board 35 having components including, but not limited to, memory chips, ROM, RAM, portions of a stepper board, i.e. steppers, capacitors, microprocessors, transistors, etc. Such integrated circuit board and components are well known to those skilled in the art. Moreover, the interconnection of the controller and its functioning integrated circuit (IC) components for controlling one or more of the components of the apparatus or system in which it is incorporated are not illustrated in the schematic drawing of FIG. 3, but are well understood by those skilled in the art and need not be further described. The apparatus or assembly shown also includes conduits or fluid lines 45, 46 for directing the halogenated aliphatic hydrocarbon fluids in the circulation line 44 to and from the controller. The specific intersections of the conduits 45, 46 with the circulation line 44 are preferably such that the fluid directed to the controller is first cooled by radiator 52 or other coolers in the system since the primary purpose for directing the fluid to the circuit board components of the controller is for cooling during operation of the system. Increased efficiency of the controller occurs by immersing or otherwise thermally exposing the integrated circuit components to the cooled fluid as the heat created by the functioning of the circuit board is reduced which also reduces interference created by misdirected currents. The fluid may be directed to the controller and the integrated circuit components immersed in the fluid as it passes along the controller components, or the fluid may otherwise come only in heat exchange contact with the components. For example, the IC components may be housed in a sandwich type, vacuum-film mold using a thin plastic film enclosing the integrated circuit board components and the fluid passed on the film in thermal contact, but not in direct physical contact with the components. Alternately, the fluid may pass with it the sandwiched film core to provide direct immersion of select components of the I.C. Board. The controller may be connected in the system for controlling the operation of the various apparatus components plus maximizing overall component efficiencies, for example, by adjusting fluid injector pressure, mechanically advancing and retarding direction of the charged fluid, for adjusting viscosity of fluids from multiple reservoirs for different components, for voltage adjustment between different brushes/injectors, for feedback for shifting alternate phases in a multi-phase DC motor for effecting optimal point switching from motor to generator, for regulating fluid volumes passing through the radiator for temperature control, for controlling speed of the pump depending on optimal speed and efficiency demands, for energizing shutdown alarms or indicator lights in response to component malfunction, fluid level or temperature alarms, etc. Circulation line 44 connects this external loop back to the DC motor and more specifically to an injector 58, associated with each brush 34, whereby filtered and cooled liquid 40 can be constantly introduced into the region between the brushes and the commutator for the purposes described herein. A pair of access caps 56 provides access to the interior of the DC motor 32 in order to maintain and service the motor such as for replacement of brushes and the like.

Figure 4:
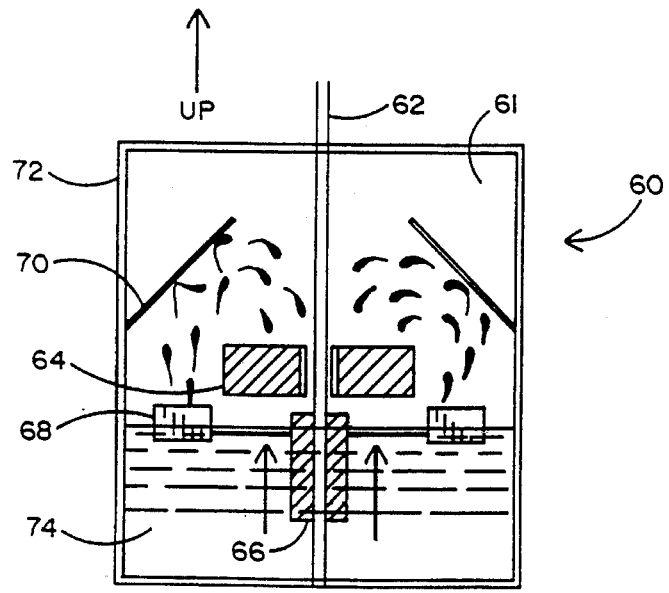
FIG. 4 illustrates an alternative splash mechanism that may be used to achieve the advantageous constant lubricating effect of the present invention.

A third embodiment of the present invention is shown in FIG. 4. The apparatus assembly 60 shown comprises a DC motor 61 having a rotating shaft 62, brushes 64 and a commutator (not shown) assembled in a conventional manner within the housing 72. However, unlike conventional DC motors, the present invention also provides a worm gear 66 to which there is attached a splash paddle 68 positioned to lie at or near the surface of a reservoir of dielectric liquid 74. The paddle rotates upon rotation of the shaft and worm gear, thus splashing the liquid upwardly toward a pair of deflectors 70. The angle of the deflectors is selected to re-direct the droplets of liquid 74 onto the brushes 64 to accomplish the liquid bathing of the brushes as seen in the earlier disclosed embodiment of the invention.

Figure 5:
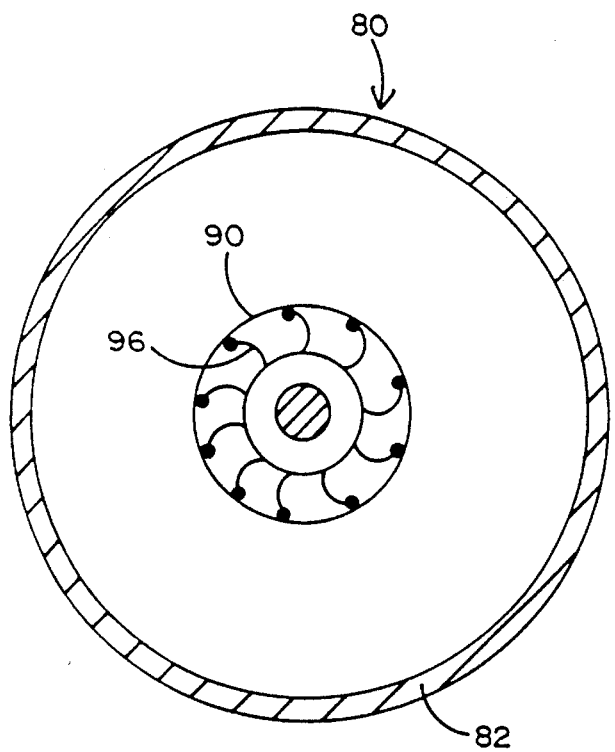
FIGS. 5 and 6 provide a cross-sectional end view and a cross-sectional side view, respectively, of an apparatus of the present invention wherein an internal impeller pump is affixed to the main shaft of a DC motor.
Figure 6:
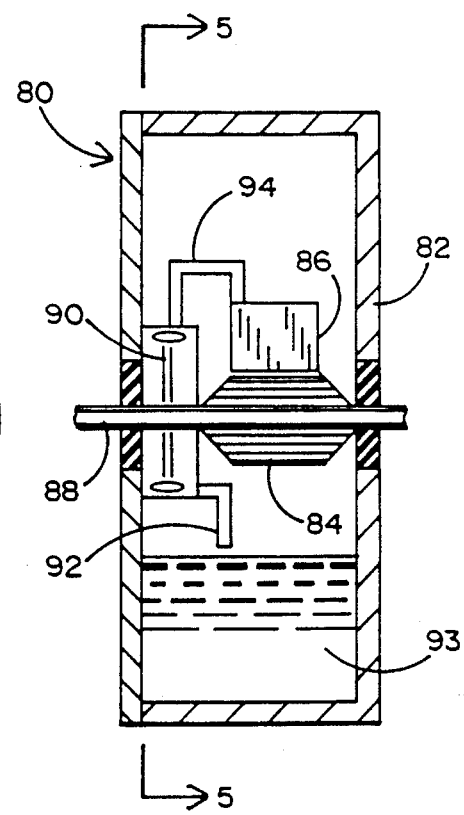
Figure 7:
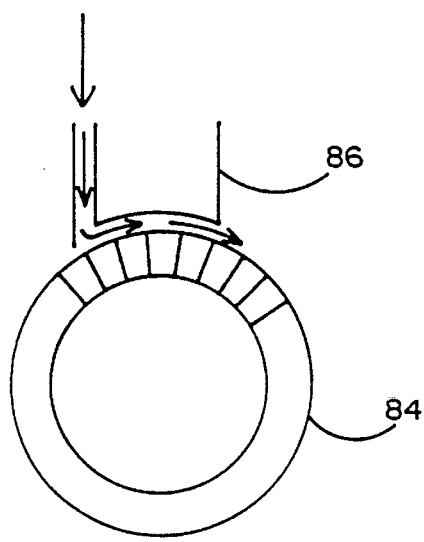
FIGS. 7 and 8 illustrate front and side views respectively, of one method of introducing the liquid of the present invention into the brushes of a DC motor.
Figure 8:
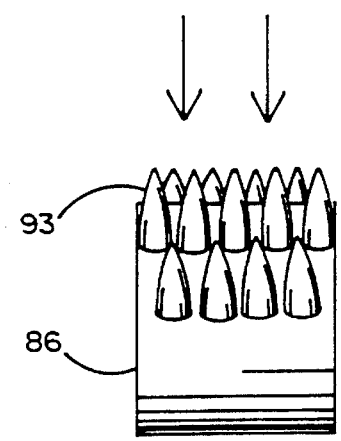

Still an alternative fourth embodiment of the present invention is shown in FIG. 5 and 6. The apparatus 80 comprises a DC motor having a housing 82, a commutator 84, brushes 86 and a shaft 88, all of which may be provided in a conventional manner. However, unlike conventional DC motors, the apparatus shown in FIGS. 5 and 6 provides an internal impeller pump 90, which is affixed to the shaft 88 for operation therewith and which provides an inlet 92 and an outlet 94. The inlet 92 is positioned at or near the surface of a reservoir of liquid contained within the housing 82. The impeller pump 90 causes a suction effect through the inlet 92 which raises a stream of the liquid 93 through the pump and into the outlet 94 by means of the pumping effect of rotating pump blades 96. As seen in FIGS. 7 and 8, the liquid 93 rolls down the side surface of the brush 86 and accumulates in the region between the brush 86 and the commutator 84, the liquid preferably adhering in large droplets to the brush 86 as shown in FIG. 8.

Figure 10:
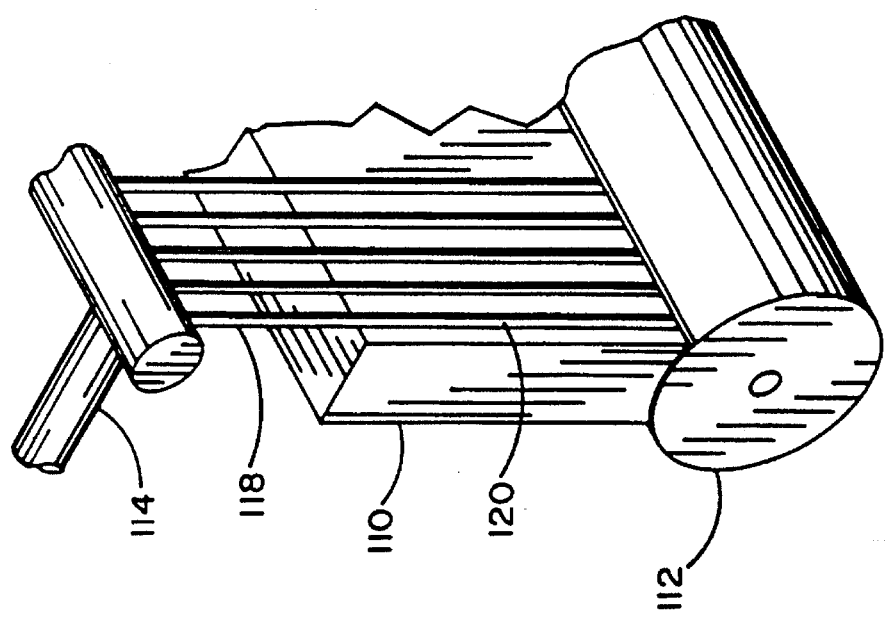
FIGS. 9 and 10 illustrate two additional alternative methods for providing a constant application of liquid to a brush/commutator interface in an electric motor.
Figure 9:
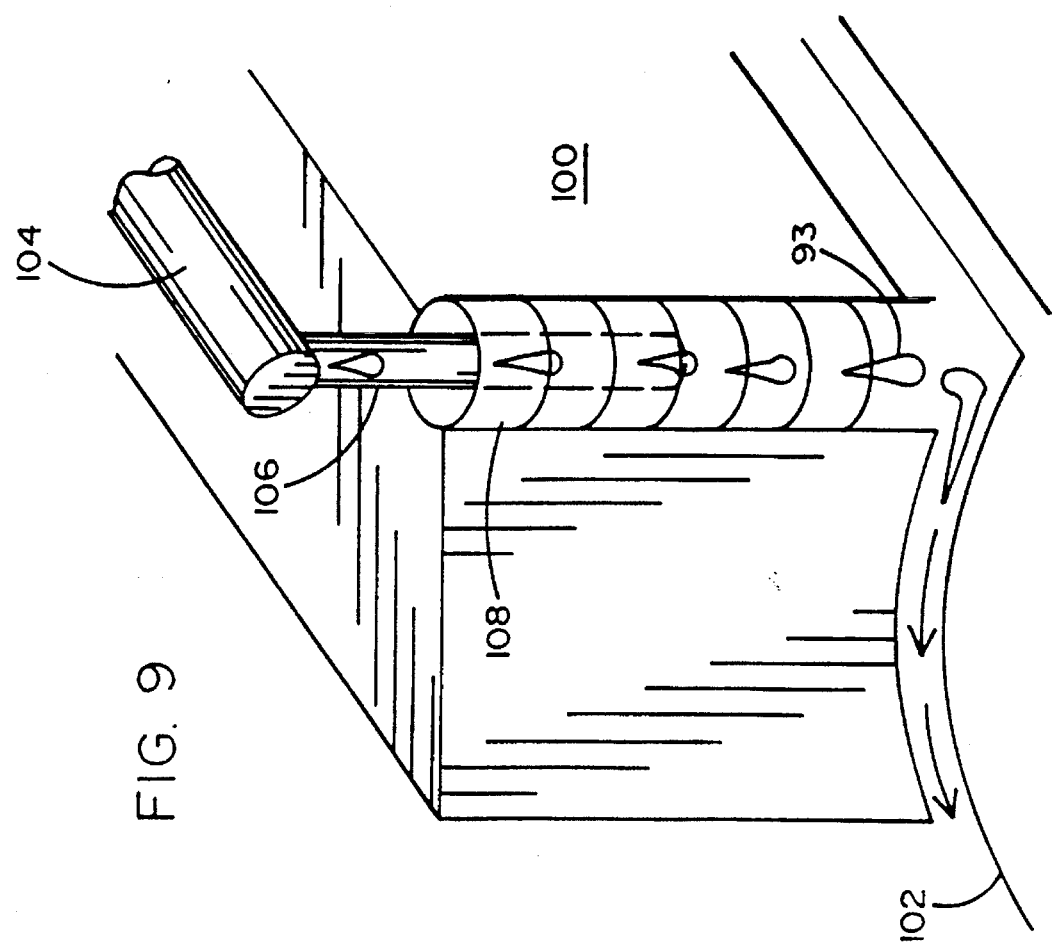

In addition to simply permitting the liquid to roll down the sides of the brushes, the present invention also contemplates the use of injectors and modifications to the brush structure to more accurately apply the liquid to the desired location between the brushes and the commutator. This aspect of the invention is shown in FIGS. 9 and 10, wherein in FIG. 9 a brush 100 is shown positioned adjacent a commutator 102. A liquid inlet 104 is positioned adjacent to and above the brush 100 and provides at least one injector 106 which is partially inserted into a passage 108 in the structure of the brush and which extends the full height of the brush, whereby liquid 93 when delivered by the inlet 104 and injector 106, flows through the passage 108 into the region between the brush and the commutator. A similar configuration is shown in FIG. 10, wherein a brush 110 is positioned adjacent a commutator 112 and an inlet 114 provides a plurality of parallel injectors 118 which are positioned in channels 120, provided in the side of the brush 110, whereby liquid is applied directly to the region between the brushes and the commutator.

Figure 11:
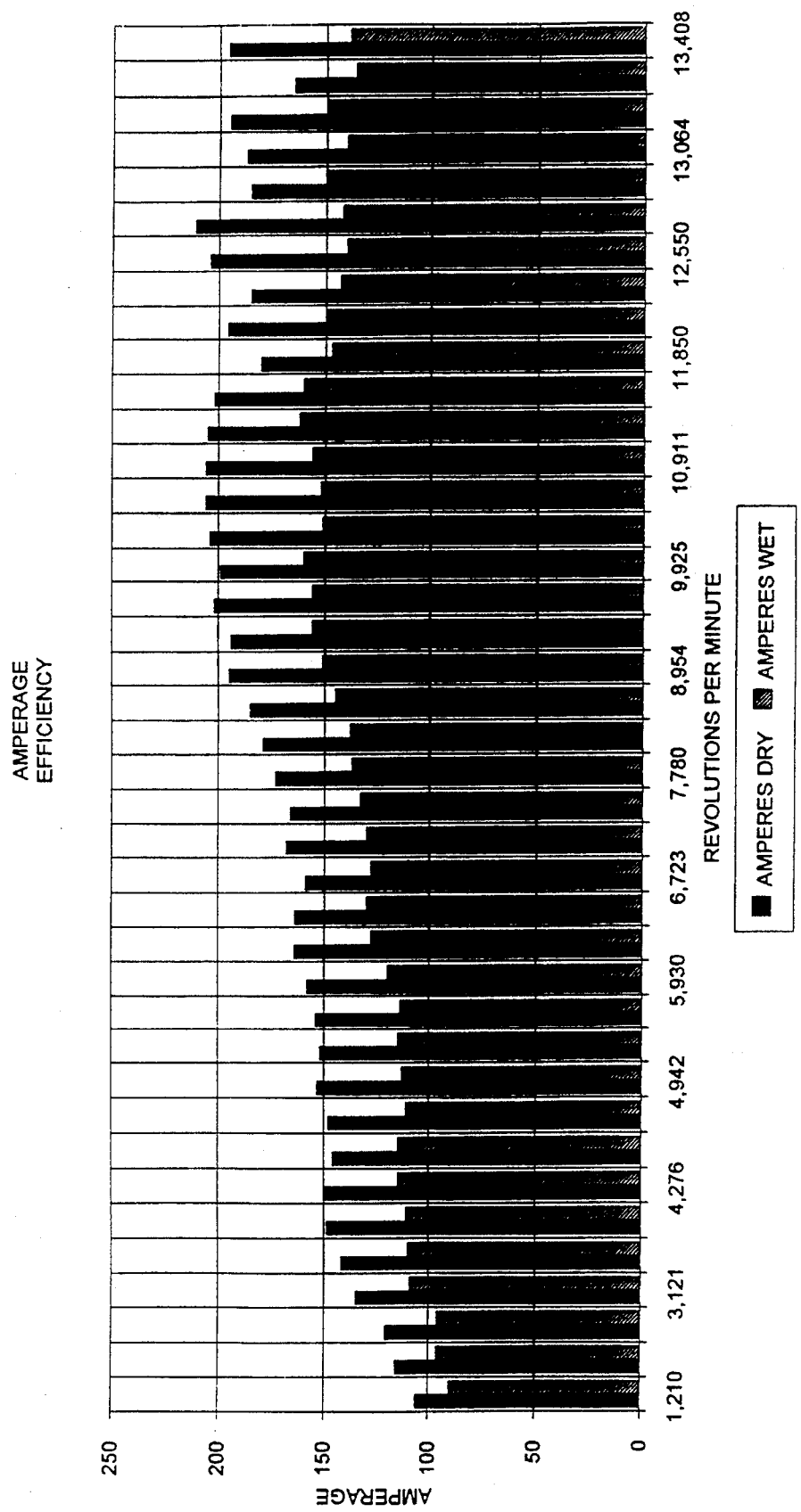
FIG. 11 is a graphical representation of efficiency (based on current) versus rotational speed for a DC motor with and without use of the invention.

FIG. 11 provides demonstrative evidence of the advantageous results derived from the present invention. The graph of FIG. 11 illustrates significant reduction in current required to operate a DC motor at different speeds between about 1200 RPM and about 13,400 RPM when a continuous bath of methyl chloroform is applied to the brushes and commutator thereof as disclosed herein. The average improvement in operating efficiency between "wet" and "dry" operation over the entire range of speeds was about 60 percent. The motor was operated under a no-load condition. However, comparable results under load conditions are anticipated.

It is presently believed that any liquid halogenated aliphatic hydrocarbon which is a stable liquid at operating temperatures of the electric motor, typically from ambient temperatures up to about 150° F. or more, is suitable for improving motor efficiency as disclosed above. Examples of such liquids include higher halogenated aliphatics having between 8 and 12 carbon atoms, for example, chlorinated straight and branched alkanes or alkyl halides including liquid chlorinated paraffins such as halogenated, and particularly chlorinated octanes, decanes and docecanes, as well as halogenated olefins. Preferred compositions are lower halogen containing aliphatics containing one or more halogens and up to 8 carbon atoms. Examples include dibromochloromethane, tetrafluoroethane, dichlorofluroethane dibromodifluoromethane, dichloropropane, dibromopropane, 1, 2-dibromo-3-chloropropane, ethylene dichloride, ethylene dibromide, dichlorobutane, dibromobutanes, tribromobutane, dibromopenane (pentamethylene dibromide), dichloropentane, tetrachlorodifluoroethane, acetylene tetrabromide (tetrabromoethane), acetylene tetrachloride, perchloroethylene (tetrachloroethylene), perchloropropylene (hexachloropropylene), hexachlorobutadiene, etc. The aforesaid list is not intended to be exhaustive of the halogenated aliphatic hydrocarbons that may be useful according to the invention, but is by way of example only. Mixtures of two or more of such liquid halogenated aliphatics may also be used.

Of course, it will be understood that the key aspect of the present invention resides in the introduction of a continuous bath of liquid halogenated aliphatic hydrocarbon into the components of an electric motor. A continuous flow of these fluids provides positive commutation between the brushes and commutator surface in a DC motor. It has been found in fact, that such a continuous liquid bath of liquid increases the performance of a DC motor by reducing sparking, friction and resistance therebetween, as well as by reducing operating temperature, by providing superior commutation, by reducing brush and commutator wear, by cleaning the surfaces of the motor parts of carbon, ash and metal particulates and by providing quieter operation and smoother transition through different speed ranges. In addition, the present invention may reduce electrical interference in certain frequencies, thereby reducing or eliminating noise interference generally caused by motor operation adjacent sensitive electronic devices, such as communication systems and the like.

It will now be understood that what has been described herein comprises a novel method and apparatus for improving the efficiency of electromagnetic devices including for example DC motors, by continuously bathing frictionally engaged moving parts thereof. Such parts include the brushes and commutator. A number of different embodiments of apparatus for applying such a bath of highly dielectric liquid to the brushes and commutator of a DC motor have been shown herein by way of example. It has been found that the invention provides a significant improvement in motor operating efficiency, as well as a significant decrease in brush and commutator wear over equal periods of time, thereby making the present invention especially advantageous for applications which require high reliability and high efficiency, such as for use in electrical powered vehicles.

It will now be apparent to those having skill in the art to which the present invention pertains, that various modifications and additions may be made to the invention. By way of example, the specific liquids disclosed herein, as well as the various alternative means for applying such liquids as a continuous bath to a rotary machine while it is running, may be readily altered while still achieving the objects of the invention recited herein. The present invention may also be suitable for use in switches, rheostats, controllers, AC inverters and other such devices. Accordingly, all such modifications and additions are deemed to be within the scope of the invention.

I claim:

1. An electric rotary apparatus comprising:
   a commutator and brushes,
   a fluid comprising one or more stable halogenated aliphatic hydrocarbons which is liquid from ambient temperatures up to about 150° F., and
   means for applying said fluid continuously to said brushes adjacent said commutator while said apparatus is running.

2. The apparatus of claim 1 wherein said one or more halogenated aliphatic hydrocarbons contain between one and twelve carbon atoms.

3. The apparatus of claim 2 wherein said one or more halogenated aliphatic hydrocarbons contain one or more chlorine atoms.

4. The apparatus of claim 2 wherein said one or more halogenated aliphatic hydrocarbons contain one or more bromine atoms.

5. The apparatus of claim 3 wherein said one or more halogenated aliphatic hydrocarbons contain one or more bromine atoms.

6. The apparatus of claim 3 wherein said one or more halogenated aliphatic hydrocarbons contain between one and eight carbon atoms.

7. The apparatus of claim 4 wherein said one or more halogenated aliphatic hydrocarbons contain between one and eight carbon atoms.

8. The apparatus of claim 5 wherein said one or more halogenated aliphatic hydrocarbons contain between one and eight carbon atoms.

9. The apparatus of claim 1 wherein said applying means comprises a pump external of said apparatus, a reservoir of said fluid connected to said pump, and fluid lines connected between said apparatus and said pump for transferring said fluid between said pump and said apparatus.

10. The apparatus of claim 1 wherein said applying means comprises:
    a pump connected within said apparatus to a rotating member of said apparatus, and
    fluid channels connected to said pump for delivering and recovering said fluid.

11. The apparatus of claim 1 wherein said applying means comprises:
    a reservoir of said fluid in said apparatus,
    a paddle within said apparatus and connected to a rotating member of said apparatus, said paddle being positioned relative to said reservoir for splashing said fluid, and
    deflectors for directing said splashed fluid onto said brushes.

12. The apparatus of claim 1 further comprising:
    at least one injector for delivering said fluid to said brushes, and
    at least one channel in said brushes for receiving said injector.

13. The apparatus of claim 1 including a DC motor.

14. The apparatus of claim 1 further comprising filter means to remove particulates greater than a selected size from said fluid.

15. The apparatus of claim 1 further comprising heat exchange means to cool said fluid.

16. The apparatus of claim 9 including a controller assembly for controlling the operation of said apparatus, and wherein said fluid lines are connected to said controller assembly for directing said fluid to and from said controller.

17. The apparatus of claim 16 wherein said controller assembly includes an integrated circuit board exposed to said fluid.

18. The apparatus of claim 17 wherein components of said integrated circuit board are immersed in said fluid.

19. The apparatus of claim 17 wherein components of said integrated circuit are thermally exposed to said fluid.

20. A method for increasing the efficiency of electric rotary apparatus of the type having a commutator and brushes comprising the steps of:
    a) providing a fluid comprising one or more halogenated aliphatic hydrocarbons which are stable liquids from ambient temperatures up to about 150° F., and
    b) continuously bathing an area of said brushes adjacent said commutator with said fluid while said apparatus is running.

21. The method of claim 20 wherein said one or more halogenated aliphatic hydrocarbons contain between one and twelve carbon atoms.

22. The method of claim 21 wherein said one or more halogenated aliphatic hydrocarbons contain one or more chlorine atoms.

23. The method of claim 21 wherein said one or more halogenated aliphatic hydrocarbons contain one or more bromine atoms.

24. The method of claim 22 wherein said one or more halogenated aliphatic hydrocarbons contain one or more bromine atoms.

25. The method of claim 22 wherein said one or more halogenated aliphatic hydrocarbons contain between one and eight carbon atoms.

26. The method of claim 23 wherein said one or more halogenated aliphatic hydrocarbons contain between one and eight carbon atoms.

27. The method of claim 24 wherein said one or more halogenated aliphatic hydrocarbons contain between one and eight carbon atoms.

28. The method of claim 20 wherein said apparatus includes a controller having an integrated circuit, said method including directing said fluid to and from said controller and thermally exposing integrated circuit components to said fluid.

29. The method of claim 28 comprising immersing said integrated circuit components in said fluid.

30. In an apparatus having rotating components; an improvement comprising:
    a source of at least one liquid comprising one or more halogenated aliphatic hydrocarbons having between one and twelve carbon atoms,
    means for applying said liquid to said components in a substantially continuous manner while said apparatus is running, and
    means for recovering and reusing said liquid in said applying means.

31. The apparatus of claim 30 comprising a DC motor and including bearings, brushes and commutator.

* * * * *